United States Patent [19]

Swanson

[11] Patent Number: 4,850,732
[45] Date of Patent: Jul. 25, 1989

[54] CO-CONIC THERMAL STRESS-FREE FASTENER

[75] Inventor: Kurt W. Swanson, San Diego, Calif.

[73] Assignee: General Dynamics Corp./Space Systems Division X, San Diego, Calif.

[21] Appl. No.: 66,784

[22] Filed: Jun. 26, 1987

[51] Int. Cl.⁴ ............................................. F16C 9/00
[52] U.S. Cl. .................................. 403/29; 403/408.1; 403/28
[58] Field of Search ................... 403/28, 29, 30, 408.1

[56] References Cited

U.S. PATENT DOCUMENTS

| | | | |
|---|---|---|---|
| 3,107,950 | 10/1963 | Kleven | 411/337 X |
| 3,172,689 | 3/1965 | Glaser | 403/30 |
| 4,299,018 | 11/1981 | Bikerstaff et al. | 403/30 X |
| 4,512,699 | 4/1985 | Jackson et al. | 403/408.1 X |

Primary Examiner—Andrew V. Kundrat
Attorney, Agent, or Firm—John R. Duncan; Frank D. Gilliam

[57] ABSTRACT

A fastener for connecting structures having significantly different coefficients of thermal expansion which substantially eliminates thermal stress with varying ambient temperatures, while allowing said structures to be offset or spaced from each other. A frusto-conical bore through a wall of a first structure receives a frusto-conical surface of an elongated fastener which is coincident with said bore. The fastener has a base secured to a second structure. A shoulder is formed on said first structure around the narrow end of said bore, the shoulder having a frusto-conical outer edge. A flange member is secured to the vertex end of said fastener, said flange member having a surface configured to engage said outer edge in a coincident relationship. The fastener is tightened to bring both pairs of coincident conical surfaces into pressure contact. Both pairs of conic surface preferably have a common vertex which lies outside the fastener. Where thermal protection requires, the bore may be formed in a bushing of a material having low thermal conductivity but similar thermal expansion characteristics.

6 Claims, 1 Drawing Sheet

CO-CONIC THERMAL STRESS-FREE FASTENER

BACKGROUND OF THE INVENTION

This invention relates in general to means for fastening structures together in an offset or spaced relationship and, more specifically, to fasteners which resist the transfer of thermal stresses and the transfer of heat from one structure to the other.

Many difficulties have been encountered, particularly in aerospace applications, in attempting to design fasteners which are free of the thermal stress which results from differential thermal expansion between dissimilar fastener and sheet materials. For example, the coefficient of thermal expansion (CTE) of carbon-carbon materials is approximately an order of magnitude lower than the CTE of typical fastener materials. This thermal expansion mismatch can cause failure of the carbon-carbon material around a standard, snug-fitting, cylindrical fastener. A clearance left around the fastener to accommodate the fastener expansion upon heating can make the joint unacceptably loose at low temperatures.

Various conical or biconic fasteners have been developed in an attempt to overcome this problem. Typically are the daze fastener system disclosed by Jackson et al. in U.S. Pat. No. 4,512,699, the various biconic fasteners and rotating bearings disclosed by Kleven in U.S. Pat. No. 3,107,950 and the various biconic and curved surface fasteners described by Blosser et al. in their paper "Theoretical Basis for Design of Thermal-stressfree Fasteners", NASA Technical Paper 2226, December 1983.

Each of these utilize a bolt-type fastener for fastening two plates of dissimilar material in a face-to-face, pressed together, arrangement. Basically, these bolts consist of a through-bolt having one or a pair of conical washers in conical recesses in the outer plate surface, so as the through-bolt is tightened, the conical washer surfaces are pressed against the recesses, tightening the plates together. In most cases, the vertices of the conical washers are coincident, substantially lying in the plane of contact of the two plates.

Since the patentees and authors of the cited documents recognize that this basic biconical fastener does not entirely eliminate the differential CTE problem, especially where the material CTE's are not isotropic, they describe a large number of variations and alternatives in an attempt to meet specific problems. Typical of these are the concave and convex surfaces of Blosser et al., the enlarged, hollow and malleable conical heads of Jacobson et al. and the intermediate ball bearings and roller bearings proposed by Kleven.

Each of the fastening means described by these patentees and authors is only useful for fastening two materials together in an abutting relationship. In many cases, it would be necessary or desirable to fasten structural panels or other structures to supports in an offset and spaced relationship.

Thus, there is a continuing need for improved fasteners for securely connecting two or more structures in a spaced relationship while eliminating any damaging stresses due to differences in CTE and limiting the heat flow between the structures.

SUMMARY OF THE INVENTION

A substantially thermal-stress-free fastener for fastening two structures having two frusto-conical mating surfaces, one within the other, both of which have a common vertex. The structure having a low CTE has a frusto-conical bore extending therethrough, with a shoulder around the vertex end. The shoulder has a frusto-conical outer edge. An elongated fastener has a base end adapted to be fastened to another structure and a frusto-conical second end complimentary to said bore. The fastener is of higher CTE material and includes a flange secured by an axial bolt to the vertex end having frusto-conical surface complimentary to said edge surface.

Said fastener is adapted to be inserted into said bore so that said second end and bore are coincident. Said flange is placed over the vertex end of the fastener and the bolt is inserted and tightened to draw the flange frusto-conical surface into snug engagement with said frusto-conical edge. The fastener will remain snug at widely varying temperatures without imparting significant thermal stress into the low CTE material.

Where the material having the low CTE has high thermal conductivity, it is preferred to secure a bushing, preferably with a spherical outer surface, into an opening in the low CTE structure. The bushing is formed from a low thermal conductivity material having substantially the same CTE as the structure. For example, with low CTE carbon-carbon materials, ceramic bushings give excellent results. The fastener is preferably formed from a metal having the desired strength or other characteristics.

BRIEF DESCRIPTION OF THE DRAWING

Details of the invention, and of certain preferred embodiments thereof, will be further understood upon reference to the drawing, wherein.

DETAILED DESCRIPTION OF THE INVENTION

Figure 1:
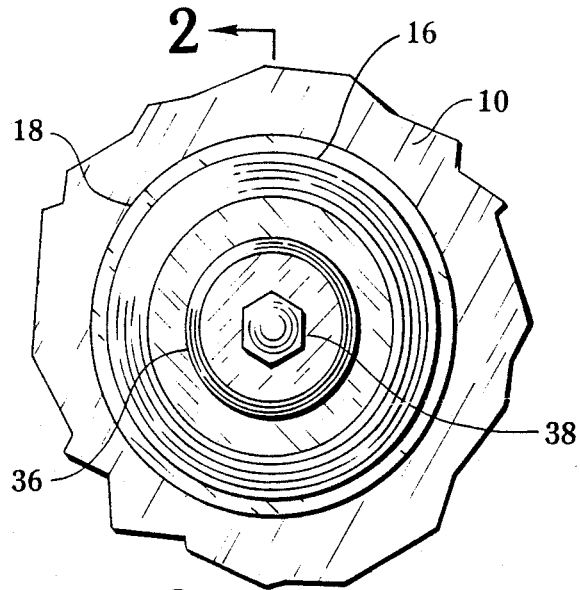
FIG. 1 is a plan view of the fastener assembly.
Figure 2:
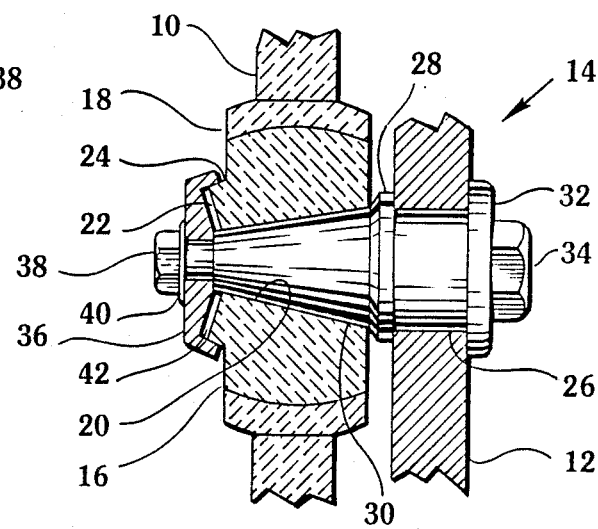
FIG. 2 is a section view taken on line 2—2 in FIG. 1.

Refering now to FIGS. 1 and 2, there is seen a first structure 10 made up of a material having a very low coefficient of thermal expansion such as carbon-carbon, certain ceramics, low CTE fiber reinforced composities, etc. First structure 10 is secured to a second structure 12 in a spaced relationship by a fastener 14 which is shown only partially in section, for clarity.

Where first structure 10 is formed from a low CTE but relatively brittle material, such as carbon-carbon, I prefer to connect fastener 14 to structure 10 through a bushing 16 of higher strength material which has a CTE substantially the same as that of structure 14 but with a thermal conductivity much lower than that of structure 14. Typically, with a carbon-carbon structure 10, bushing 16 may be a silica-silica composite ceramic material. Preferably, bushing 16 has a spherical outer surface within a retainer 18 integral with structure 10. If desired, bushing 16 need not be secured to retainer 18 to permit limited rotation of the bushing relative to the retainer for ease of alignment during assembly.

Bushing 16 has a frusto-conical bore 20 therethrough with a raised shoulder 22 around the vertex end of bore 20. Shoulder 22 has a frusto-conical outer edge 24. The conic surfaces of bore 20 and edge 24 have a common vertex.

The body of fastener 14 has a cylindrical portion 26 extending through a cylindrical opening in second structure 12, a flange 28 abutting the inner surface of structure 12 and a frusto-conic section 30 coincident with bore 20.

Fastener 14 is secured to second structure 12 by a washer 32 and bolt 34 threaded into cylindrical portion 26.

A flanged member 36 is secured to the vertex end of conical section 30 by a bolt 38 (threaded into conical section 30) and washer 40. Flanged member 36 has an inwardly-directed frusto-conical surface 42 which is coincident with edge surface 24. Bolt 38 is tightened to bring each pair of coincident conical surfaces into a snug relationship.

Figure 3:
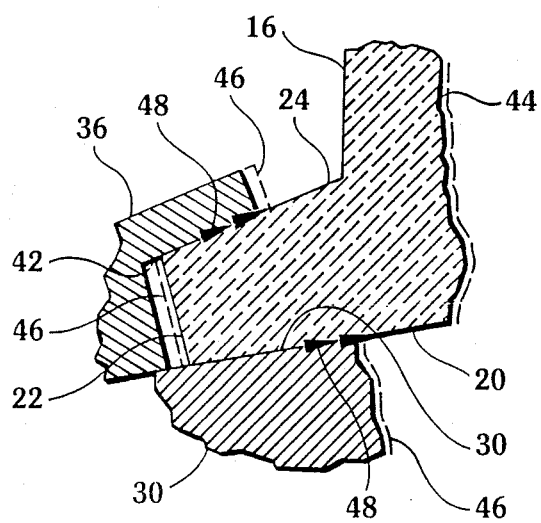
FIG. 3 is a detail section view illustrating the differential thermal expansion of the fastener components.

FIG. 3 schematically illustrates the response of the assembly to increased temperature. As the detailed portion shown in FIG. 3 shows, bushing 16, which has a low CTE, expands to a slight degree as illustrated by broken line 44 while metallic section 30 and flanged member 36, having a much higher CTE, expands to the extent shown by broken lines 46. Slippage direction is indicated by arrows 48. Expansion is, of course, exaggerated in FIG. 3 for clarity. Thermal expansion occurs parallel to the conic surfaces as measured from the vertices of the cones. Thus, the assembly remains firmly and snugly in engagement without developing undue thermal stresses despite significant temperature changes.

While certain preferred materials, relationships and dimensions were detailed in the above description of a preferred embodiment, these may be varied where suitable with similar results. For example, if first structure 10 has sufficient strength, the conical surfaces may be formed or machined directly in the structure material and bushing 16 need not be used, although in most cases bushing 16 is preferred.

Other variations, applications and ramifications of the present invention will occur to those skilled in the art upon reading this disclosure. Those are intended to be included within the scope of this invention, as defined in the appended claims.

I claim:

1. A co-conic substantially stress free offset fastener for materials having substantially different coefficients of thermal expansion which comprises:

a bushing secured in a first structure, said bushing and first structure materials having a first, substantially similar, coefficient of thermal expansion;

a frusto-conical bore through said bushing;

a shoulder on the side of said bushing surrounding said bore;

said shoulder having a frusto-conical outer edge;

said bore and edge having different cone angles but the same vertex;

a fastener having a frusto-conic section having an outer surface coincident with said bore;

a flanged member on the vertex end of said fastener having a frusto-conical surface coincident with said frusto-conical outer edge surface;

means for tightening said fastener to bring both pairs of concident surfaces into pressure contact; and means for connecting said fastener to a second structure offset from said first structure and having a different coefficient of thermal expansion from that of said first structure;

whereby said first and second structures are held together in a substantially stress-free relationship despite changes in ambient temperature.

2. The fastener according to claim 1 wherein said bushing has a substantially spherical outer surface retained within a retainer ring having a correspondingly spherical inner surface, with the retainer ring mounted in a hole in said first structure.

3. The fastener according to claim 1 wherein said bushing is formed integrally with said first structure.

4. The fastener according to claim 1 wherein the vertices of said frusto-conical bore and said frusto-conical outer surface are substantially coincident.

5. The fastener according to claim 1 wherein said means for connecting said fastener to a second structure comprises a substantially cylindrical portion extending from the base of said frusto-conic section, an outwardly extending flange between cylindrical portion and frusto-conic section, and a threaded bore in the end of said cylindrical portion adapted to receive a bolt, whereby said cylindrical portion can be extended through a cylindrical hole in a second structure and a bolt can be inserted to secure said second structure between flange and bolt.

6. The fastener according to claim 1 wherein said means for tightening said fastener comprises a bolt extending through the center of said flanged member into a threaded hole in the vertex end of said conical section.

* * * * *